(12) United States Patent
Iida

(10) Patent No.: US 8,583,366 B2
(45) Date of Patent: Nov. 12, 2013

(54) ROAD SHAPE LEARNING APPARATUS

(75) Inventor: Masahiro Iida, Kariya (JP)

(73) Assignee: DENSO CORPORATION, Kariya (JP)

( * ) Notice: Subject to any disclaimer, the term of this patent is extended or adjusted under 35 U.S.C. 154(b) by 243 days.

(21) Appl. No.: 13/030,350

(22) Filed: Feb. 18, 2011

(65) Prior Publication Data

US 2011/0218724 A1 Sep. 8, 2011

(30) Foreign Application Priority Data

Mar. 4, 2010 (JP) .................................. 2010-47730

(51) Int. Cl.
*G06F 15/18* (2006.01)
*G01C 21/30* (2006.01)

(52) U.S. Cl.
CPC ............... *G06F 15/18* (2013.01); *G01C 21/30* (2013.01)
USPC ............................................ 701/450; 701/70

(58) Field of Classification Search
CPC ................................. G06F 15/18; G01C 21/30
USPC ........... 701/70, 411, 412, 445, 446, 450, 508, 701/521
See application file for complete search history.

(56) References Cited

U.S. PATENT DOCUMENTS

| 5,154,248 | A | * | 10/1992 | Schwager et al. ............ 180/168 |
|---|---|---|---|---|
| 5,390,118 | A | * | 2/1995 | Margolis et al. ................ 701/23 |
| 5,661,650 | A | | 8/1997 | Sekine et al. |
| 6,163,741 | A | | 12/2000 | Matsuda et al. |
| 6,199,011 | B1 | * | 3/2001 | Matsuda ........................ 701/411 |
| 6,268,825 | B1 | * | 7/2001 | Okada ....................... 342/357.52 |
| 6,778,896 | B1 | * | 8/2004 | Matsuura et al. ............... 701/70 |
| 7,561,032 | B2 | * | 7/2009 | Huang et al. ................... 340/435 |
| 7,756,634 | B2 | * | 7/2010 | Mori ............................. 701/507 |
| 7,831,389 | B2 | * | 11/2010 | Yamada ........................ 701/412 |
| 2003/0195703 | A1 | * | 10/2003 | Ibrahim ........................ 701/301 |
| 2004/0183663 | A1 | * | 9/2004 | Shimakage ................... 340/436 |
| 2007/0078594 | A1 | * | 4/2007 | Mori ............................. 701/207 |
| 2007/0168119 | A1 | * | 7/2007 | Mori ............................. 701/207 |

(Continued)

FOREIGN PATENT DOCUMENTS

| JP | A-8-194890 | 7/1996 |
|---|---|---|
| JP | A-11-328596 | 11/1999 |

(Continued)

OTHER PUBLICATIONS

Search Report dated Jun. 30, 2011 in a corresponding GB patent application No. 1103681.1.

(Continued)

*Primary Examiner* — John Q Nguyen
*Assistant Examiner* — Michael Whalen
(74) *Attorney, Agent, or Firm* — Posz Law Group, PLC

(57) ABSTRACT

When determining that a subject vehicle traveled a curve, a road shape learning apparatus amends an entrance coordinate, a middle coordinate, and an exit coordinate of the curve based on predetermined amendment values to thereby obtain a post-amendment entrance coordinate, a post-amendment middle coordinate, and a post-amendment exit coordinate. The road shape learning apparatus computes a radius of a circular arc which passes through the post-amendment entrance coordinate, the post-amendment middle coordinate, and the post-amendment exit coordinate and designates the computed radius as a curvature radius of the curve.

14 Claims, 9 Drawing Sheets

(56) References Cited

U.S. PATENT DOCUMENTS

| | | | |
|---|---|---|---|
| 2007/0198177 A1* | 8/2007 | Yamada | 701/208 |
| 2009/0248768 A1* | 10/2009 | Fukumoto et al. | 708/207 |
| 2010/0082212 A1 | 4/2010 | Miyajima et al. | |
| 2010/0104139 A1* | 4/2010 | Kuehnle et al. | 382/106 |
| 2010/0250064 A1 | 9/2010 | Ota et al. | |
| 2011/0102166 A1* | 5/2011 | Filev et al. | 340/435 |
| 2011/0178689 A1* | 7/2011 | Yasui et al. | 701/70 |

FOREIGN PATENT DOCUMENTS

| | | |
|---|---|---|
| JP | A-2001-108450 | 4/2001 |
| JP | A-2004-347069 | 12/2004 |
| JP | A-2006-137262 | 6/2006 |

OTHER PUBLICATIONS

Office Action dated Feb. 4, 2013 in corresponding CN Application No. 201110054161.5 (and English translation).

* cited by examiner

LEFT-HAND TRAFFIC

LEFT-HAND TRAFFIC

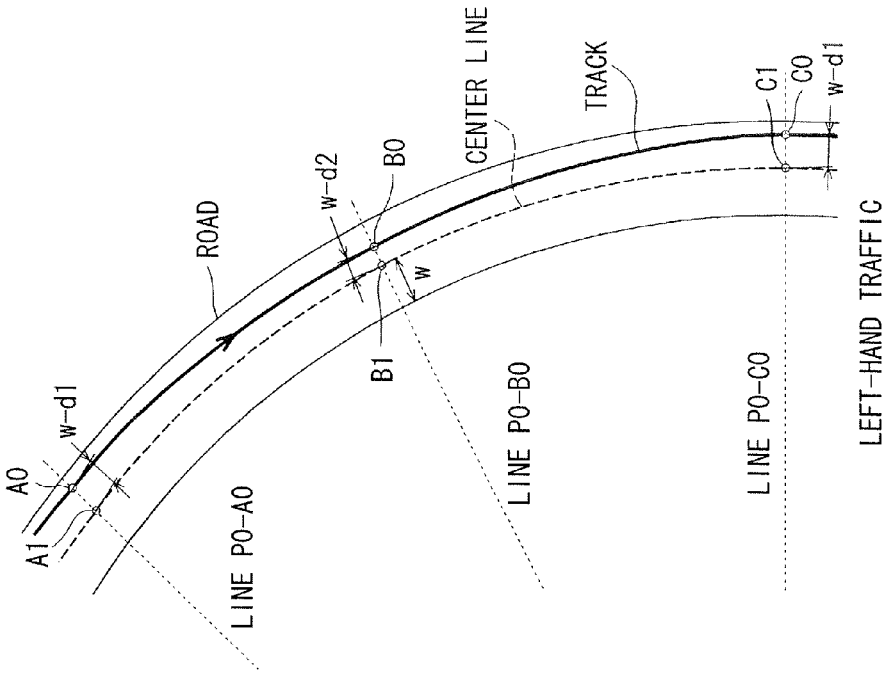
FIG. 6A  LEFT-HAND CURVE
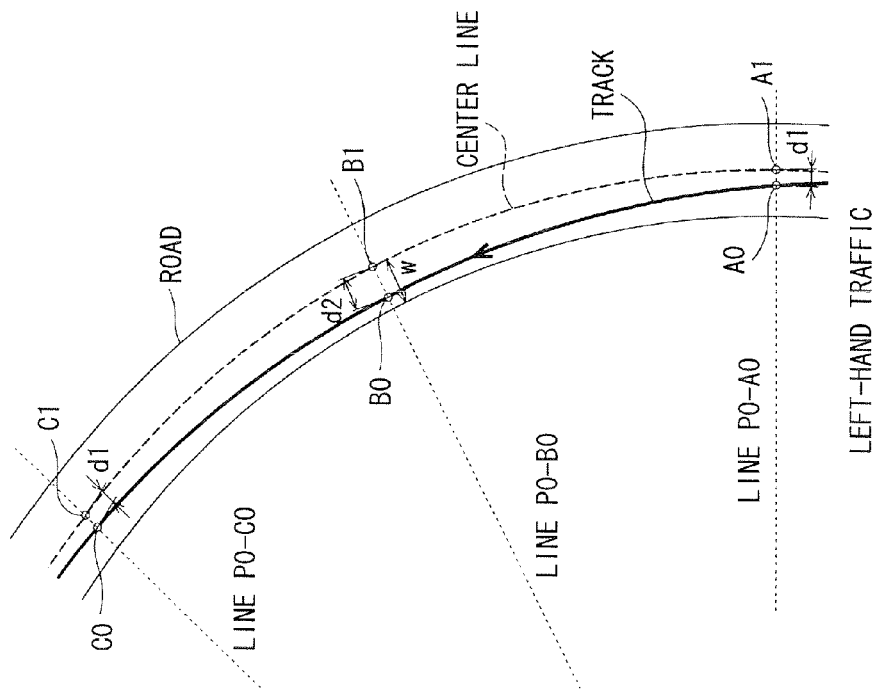
FIG. 6B  RIGHT-HAND CURVE

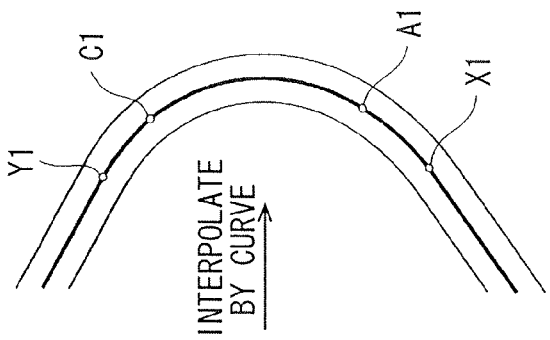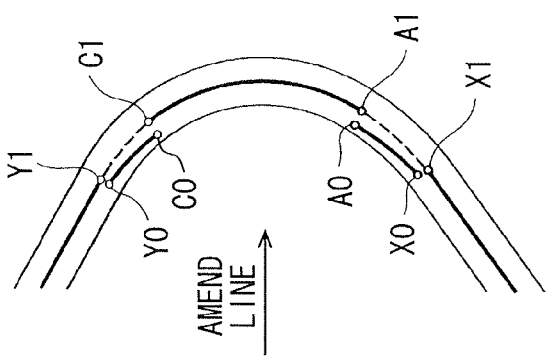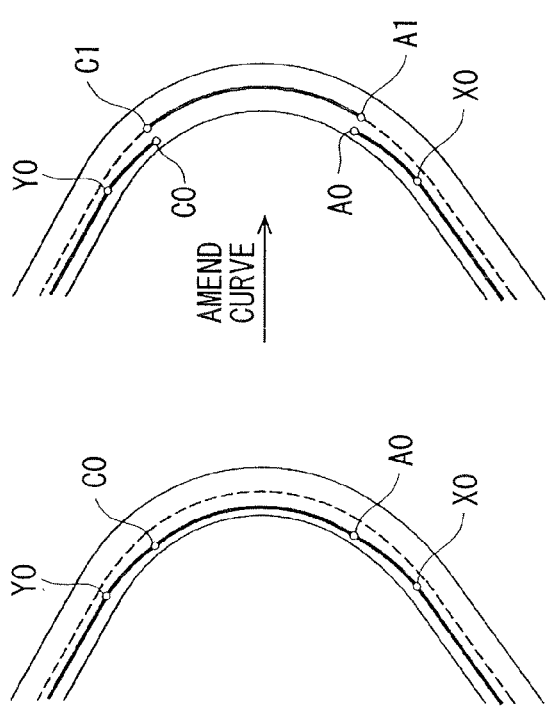

ROAD SHAPE LEARNING APPARATUS

CROSS REFERENCE TO RELATED APPLICATION

The present application is based on and incorporates herein by reference Japanese Patent Application No. 2010-47730 filed on Mar. 4, 2010.

FIELD OF THE INVENTION

The present invention relates to a road shape learning apparatus which learns a shape of a road.

BACKGROUND OF THE INVENTION

[Patent document 1] JP-H11-328596 A

In recent years, there is known a vehicular application which provides a driving assistance or control of a behavior in cooperation with an in-vehicle navigation apparatus. Such an application is referred to as a navigation-cooperative application. Such a navigation-cooperative application uses map data or a present position acquisition function, which is provided in the navigation apparatus, and serves as an apparatus or function to provide an assistance to a safe and comfortable driving operation. For example, Patent document 1 discloses a road shape learning apparatus provided as follows. The maximum radius of a curvature of a travel line expected in a curve is acquired based on road shape data such as a road width or curvature radius of a curve out of various data contained in map data. Based on the acquired maximum curvature radius, a target vehicle velocity at the curve entrance is calculated.

In Patent document 1, the road shape of the travel line is acquired from the map data; a suitable vehicle velocity is designated according to the road shape. This enables an enhancement in safety and a comfortable travel meeting with driver's sensibility.

Incidentally, there is a case that map data is prepared by old measurement data or an error occurs when authoring map data. Such a case may pose a risk in the configuration where a target vehicle velocity is calculated based on the curvature radius stored in the map data like in Patent document 1. That is, when the curvature radius greater than that of the actual shape of the road is stored in the map data, there is a possibility that the target vehicle velocity is calculated to be higher than an intended one. Therefore, in such a navigation-cooperative application, especially, to control the behavior of the vehicle, the detailed map data is thereby necessary which indicates the shape of the road accurately.

However, in order to prepare the detailed map data which indicates the shapes of roads accurately, a huge cost and large volume of storage area are needed. It is not easy to previously prepare the map data accurately.

SUMMARY OF THE INVENTION

The present invention is made in view of the above-mentioned situation. It is an object of the present invention to provide a road shape learning apparatus which improves previously stored map data so as to obtain detailed map data which indicates an actual shape of a road more accurately.

To achieve the above object, according to an example of the present invention, a road shape learning apparatus for a vehicle is provided as follows. A map data storage device is configured to store map data. A position acquisition device is configured to acquire position information relative to a position of the vehicle. A position extraction section is configured to, when it is determined that the vehicle traveled a curve, specify an entrance, a middle, and an exit of the curve based on the map data, and extract an entrance coordinate, a middle coordinate, and an exit coordinate which indicate the positions of the vehicle corresponding to the entrance, the middle, and the exit, respectively, from the position information relative to the vehicle acquired by the position information acquisition device. A position amendment section is configured to obtain a post-amendment entrance coordinate, a post-amendment middle coordinate, and a post-amendment exit coordinate, which are obtained by amending the entrance coordinate, the middle coordinate, and the exit coordinate using amendment values which are predetermined depending on a travel tendency. A curvature radius computation section is configured to compute a radius of a circular arc passing through the post-amendment entrance coordinate, the post-amendment middle coordinate, and the post-amendment exit coordinate and designate the computed radius as a curvature radius of the curve. A learned data storage device is configured to store the designated curvature radius as learned data associated with the map data.

An amendment in calculating a curvature radius of a curve is aimed to adjust the following error. That is, when the curvature radius of the curve is calculated based on the entrance coordinate, middle coordinate, and exit coordinate, all of which indicate the positions the subject vehicle actually traveled, the calculated curvature radius may differ from the actual curvature radius of a curve (referred to as an actual curvature radius). Such a difference or error originates from the travel tendency. The entrance coordinate, the middle coordinate, and the exit coordinate are amended using the amendment values responding to the travel tendency, thereby obtaining the post-amendment entrance coordinate, the post-amendment middle coordinate, and the post-amendment exit coordinate. The curvature radius of the curve is calculated based on the post-amendment entrance coordinate, the post-amendment middle coordinate, and the post-amendment exit coordinate. The radius of the circular arc which passes through each point of the post-amendment entrance coordinate, the post-amendment middle coordinate, and the post-amendment exit coordinate is calculated in detail, and this radius is designated or set up as the curvature radius of the curve. Thus, the curvature radius of the designated curve becomes closer to the actual curvature radius because the amendment responding to the travel tendency has been made. That is, when calculating the curvature radius of the curve based on the position information relative to the subject vehicle, it becomes possible to calculate a curvature radius closer to or more resembling the actual shape of the road. Then, the calculated curvature radius is stored as learned data associated with the map data. For example, the learned data can be used for the next travel of the same curve. Therefore, the map data can be improved to be more detailed so as to be suited to the actual shape of the curve.

BRIEF DESCRIPTION OF THE DRAWINGS

The above and other objects, features, and advantages of the present invention will become more apparent from the following detailed description made with reference to the accompanying drawings. In the drawings:

FIG. 6A is a diagram illustrating amendment values in a left-hand curve relative to a heading direction;

FIG. 6B is a diagram illustrating a an amendment values relative to a heading direction;

FIGS. 8A to 8D are schematic diagrams illustrating an amendment for a curve portion and a straight line portion according to a modification of the first embodiment;

DETAILED DESCRIPTION OF THE PREFERRED EMBODIMENTS

Figure 1:
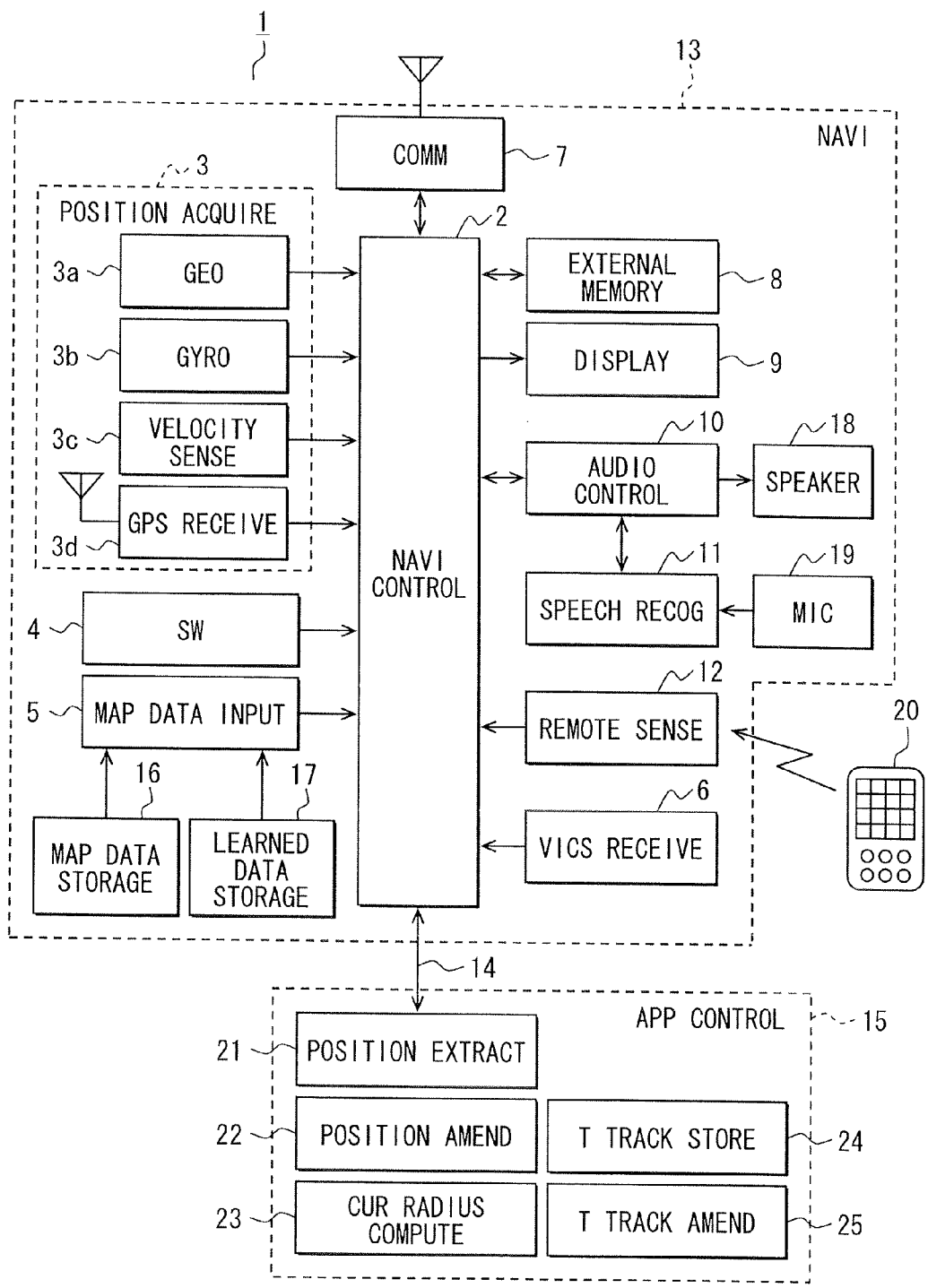
FIG. 1 is a diagram illustrating a schematic configuration of a road shape learning apparatus according to a first embodiment of the present invention.

Hereinafter, several embodiments of a road shape learning apparatus according to the present invention are described based on the drawing. In the embodiments, a substantively identical element or configuration is assigned with an identical reference number; the duplicated explanation is omitted.

Further, the following explains the embodiment on the premises that a road is of a left-hand traffic, which is used like in Japan, Great Briton, or the like. Without need to be limited, the present invention may be naturally applied to a road of a right-hand traffic, which is used like in the United States of America.

First Embodiment

A road shape learning apparatus according to a first embodiment of the present invention is explained with reference to FIGS. 1 to 8D. FIG. 1 is a functional block diagram illustrating an overall configuration of the road shape learning apparatus 1. The road shape learning apparatus 1 is mounted in a subject vehicle and includes a so-called in-vehicle navigation apparatus 13 and an application control circuit 15, which is connected with the navigation apparatus 13 via a communications link 14. The navigation apparatus 13 includes a control circuit 2, a position acquisition device 3, a manipulation switch group 4, a map data input device 5, a VICS (Vehicle Information Communication System, registered trademark) receiver 6, a communications device 7, an external memory 8, a display device 9, an audio controller 10, a speech recognition device 11, and a remote control sensor 12.

The control circuit 2, which is also referred to as a navigation control circuit, includes a microcomputer containing a CPU, RAM, ROM, and I/O bus. For example, the control circuit 2 executes a control program stored in the ROM to thereby execute an overall control of the navigation apparatus 13. Further, the control circuit 2 temporarily stores (i) processing data when executing the program, (ii) position information of the vehicle acquired from the position acquisition device 3, or (iii) map data acquired from the map data input device 5.

The position acquisition device 3 includes a well-known geomagnetic sensor 3a, a gyroscope 3b, a vehicle velocity sensor 3c, and a GPS receiver 3d. The geomagnetic sensor 3a, the gyroscope 3b, the vehicle velocity sensor 3c, and the GPS receiver 3d have mutually different types of detection errors. The position acquisition device 3 acquires the position information of the vehicle by complementing detection signals inputted from the geomagnetic sensor 3a, the gyroscope 3b, the vehicle velocity sensor 3c, and GPS receiver 3d. In addition, the position acquisition device 3 may not need all the foregoing sensors or the like, as long as acquiring the position information in a required detection accuracy. Moreover, the position acquisition device 3 may further include a steering sensor for detecting a steering angle, and a wheel sensor for detecting rotation of wheels (none shown). The position acquisition device 3 outputs the acquired position information on the subject vehicle to the control circuit 2.

The manipulation switch group 4 includes a mechanical key (unshown) which is arranged around the display device 9 or a touch-sensitive key which is formed on a display screen of the display device 9. The manipulation switch group 4 outputs a manipulation signal to the control circuit 2 when detecting that a user executes a manipulation (for example, menu display selection, destination designation, route retrieval, route guidance start, display window change, or volume control).

The map data input device 5 is connected to a map data storage device 16, which stores map data, and a learned data storage device 17, which stores learned data mentioned later. The map data input device 5 executes reading of the map data from these map data storage device 16 and the learned data storage device 17, and the learned data, while executing the writing of the learned data to the learned data storage device 17. The map data storage device 16 and the learned data storage device 17 include, for example, a storage media such as CD-ROM, DVD-ROM, and HDD. It is noted that as long as writing data is possible with respect to the learned data storage device 17, the map data storage device 16 and the learned data storage device 17 share a single storage medium or have two individual storage media.

The map data storage device 14 stores map data, which include map drawing data for map display; road data necessary for various processes such as map matching, route retrieval, and route guidance; intersection data which include detailed data on intersections; background data for displaying background layers; place name data for displaying place names or areas; facility name data where facility names are arranged in a predetermined character order such as an alphabetical order, Japanese 50 character order; and phone number data which indicate correspondence between phone numbers and facilities. Further, in association with the present embodiment, the map data storage device 16 further includes road class information which indicates distinction between a highway and a local road; road slope information; road width information; node information which indicates positions on map; link information which indicates a connection state of each node; and road shape data (straight line, curve, curvature radius of curve). The road shape data is prepared by authoring the map of 1/20,000 which the Geographical Survey Institute publishes, for example. The details of the learned data stored by the learned data storage device 17 are mentioned later.

The VICS receiver 6 performs wide area communications via a wide area network and receives VICS information transmitted from a VICS Center apparatus (unshown). The communications device 7 includes a wireless communications means such as a cellular phone or wireless LAN and performs wide area communications via a wide area network while transmitting and receiving various kinds of information with a server (unshown). The external memory 8 includes a data rewritable nonvolatile memory such as a flash memory. For example, the external memory 8 is provided to store a program software for responding to or complying with an information storage medium of other standards, and store or read out specific data (image data, music data, etc.). The external memory 8 is provided to be detachable from the navigation apparatus 13.

The display device 9 includes, for example, a liquid crystal display. The display device 9 displays various (display) windows such as a menu selection window, a destination designation window, and a route guidance window together with a present position mark indicating a present position of the vehicle, a travel track, etc. Those are displayed in superimposition on the map of the map data. In addition, the display device 9 may include an organic electroluminescence (EL) or a plasma display.

The audio controller 10 is connected with the speaker 18 and the speech recognition device 11. The audio controller 10 outputs beep sounds, guide sounds of route guidance, etc. via the speaker 18, for example. The speech recognition device 11 is connected with the microphone 19 and performs speech recognition of sounds or speeches inputted via the microphone 19 based on a speech-recognition algorithm. The microphone 19 accepts so-called voice commands that controls functions of the navigation apparatus 13, similar to manipulation signals inputted via the manipulation switch group 4. The remote control sensor 12 transmits and receives various kinds of manipulation signals with the remote control 20. The remote control sensor 12 receives a manipulation signal transmitted from the remote control 20, and outputs it to the control circuit 2. The user can input various kinds of manipulation signals to the navigation apparatus 13 like the voice command mentioned above by manipulating the remote control 20.

The communications link 14 includes wired or wireless communications means and connects between the navigation apparatus 13 and the application control circuit 15 so that transmission and reception of various kinds of information are possible. The communications link 14 may be a dedicated communications manner. Alternatively, another so-called standard manner may be used such as USB, Bluetooth (registered trademark), or in-vehicle LAN including CAN or FlexRay (registered trademark). When the communications link 14 is connected to the in-vehicle LAN, the navigation apparatus 13 and the application control circuit 15 are enabled to acquire a variety of information from in-vehicle sensors such as an engine rotation number sensor which detects the number of rotation of the engine, an accelerator opening sensor which detects an amount of stepping-in of an accelerator, a steering sensor which detects a steering angle. Further, the navigation apparatus 13 and the application control circuit 15 are enabled to transmit and receive information with an ECU such as an engine control ECU and a brake control ECU (unshown).

The application control circuit 15 includes a microcomputer containing a CPU, RAM, ROM, and I/O bus (none shown) and executes a control program stored in the ROM etc., for instance. The application control circuit 15 includes a position extraction section 21, a position amendment section 22, a curvature radius computation section 23, a travel track storage section or device 24, and a travel track amendment section 25. The application control circuit 15 acquires map data and position information of the subject vehicle from the navigation apparatus 13, and computes a shape, in particular a curvature radius, of a road the subject vehicle traveled based on the acquired map data and position information. The position extraction section 21, position amendment section 22, curvature radius calculation section 23, travel track storage section 24, and travel track amendment section 25 are provided to be software functions or sections using a program processed by the CPU of the application control circuit 15, in the present embodiment. However, without need to be limited thereto, those sections may be provided to be hardware sections.

Figure 2:
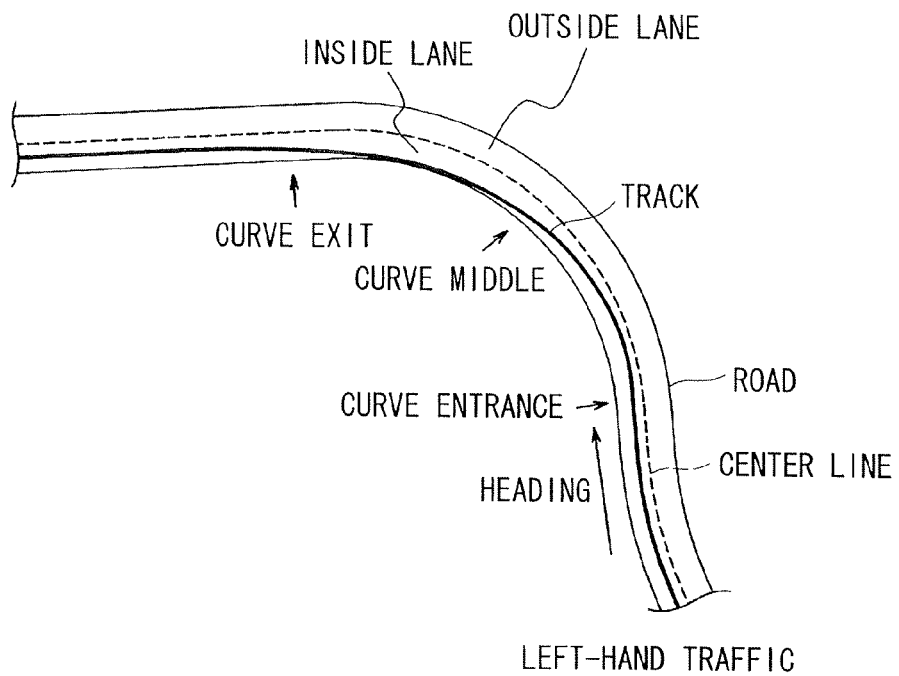
FIG. 2 is a schematic diagram comparing a road shape with a travel track of a subject vehicle.

Next, an operation of the road shape learning apparatus 1 is explained. FIG. 2 is a schematic diagram comparing a road shape with a travel track of the subject vehicle. As illustrated in FIG. 2, the present embodiment aims at a road of left-hand traffic having a single lane (i.e., an inside lane or an outside lane) for each of the mutually opposing traffics, which sandwich a center line, for instance. Further, for instance, it is premised that the road has a curve to the left (i.e., left-hand curve) relative to the heading direction or traffic direction, which is indicated by an arrow in FIG. 2.

Figure 3A:
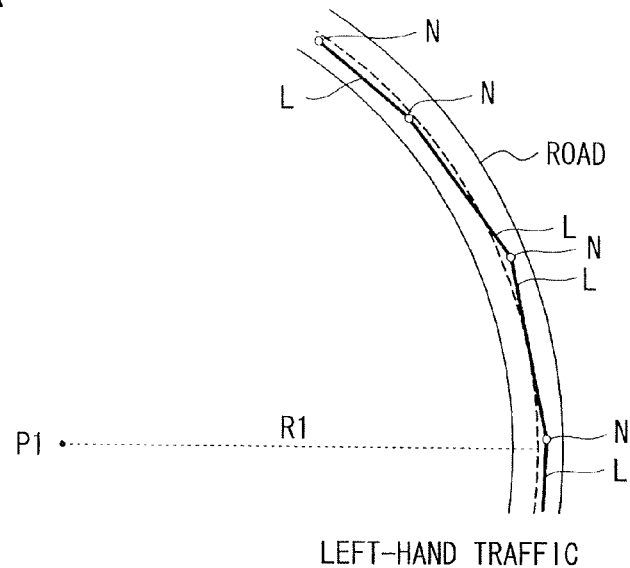
FIG. 3A is a schematic diagram illustrating a road of a left-hand curve with nodes and links stored in map data.

Now, the map data stored in the map data storage device 16 stores not all the data of the coordinates on the road; as illustrated in FIG. 3A, the map data include several nodes N which are information on positions separated from each other, and several links L which connects adjoining nodes or each node with another node. In this case, each node N and each link L are generally recorded as data on positions equivalent to the center (i.e., center line in FIG. 3A) in the road width direction. For the above-mentioned reasons, those do not accord with the center of the road necessarily.

Figure 3B:
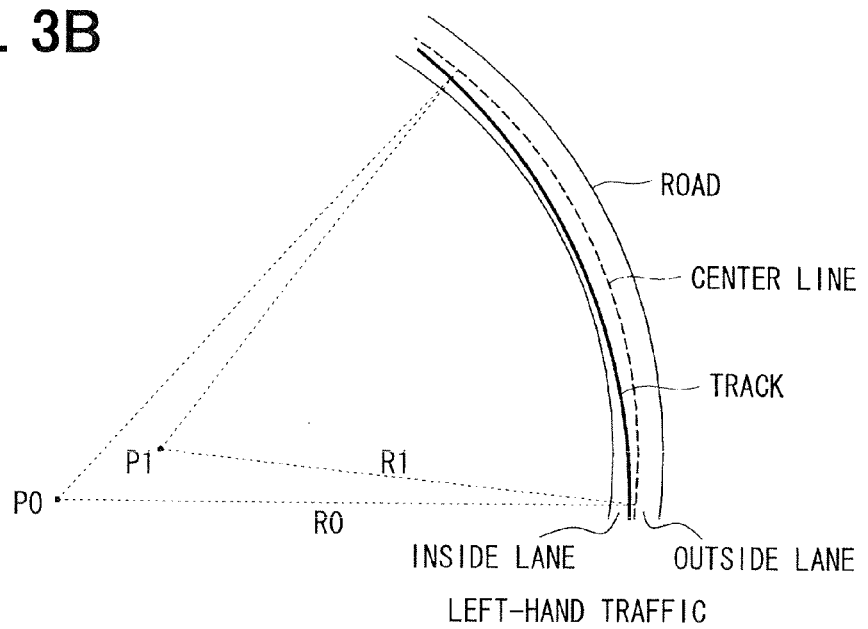
FIG. 3B is a schematic diagram illustrating a road of a left-hand curve with a travel track while indicating an actual curvature radius and a curvature radius calculated from the travel track.

In addition, a travel track of the subject vehicle at the time of traveling a curve has a travel tendency of so-called out-in-out tendency, where near the curve entrance, the travel track or the subject vehicle is closer to the center line; near the curve middle, the travel track is closer to a road shoulder of the inside of the curve; and near the curve exit, the travel track is again closer to the center line. Thus, as illustrated in FIG. 3B, the curvature radius R0 (center position P0), which is calculated based on the travel track of an inside lane, is greater than the curvature radius R1 (center position P1), which is pertinent to the center line of the actural center of the road width. In addition, if the subject vehicle travels oppositely an outside lane of the same curve of the road, a curvature radius obtained from a travel track is different from the curvature radius R0. In other words, with respect to a curve of a road, curvature radiuses obtained from travel tracks of traveling the right-hand curve and the left-hand curve are different from each other. Further, the shape of the road estimated from the travel track changes based on travel tendencies (for example, out-in-out).

To that end, in the road shape learning apparatus 1 of the present embodiment, in order to make more detailed the map data stored previously, the shape of a road is found based on an actual travel track; the found road shape is stored in the learned data storage device 17 as learned data. Such learned data signifies road shape data, which is calculated based on the travel track of the vehicle while having a value more similar to that of an actual road shape than that in the map data stored in the map data storage device 16.

Figure 4:
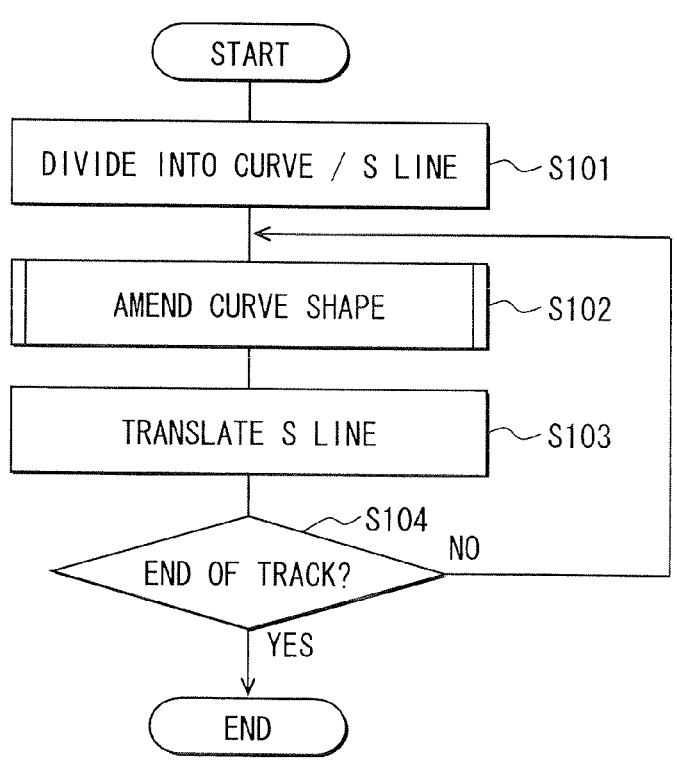
FIG. 4 is a flowchart diagram illustrating a main process of the road shape learning apparatus.

FIG. 4 is a flowchart which illustrates a main process by the application control circuit 15 of the road shape learning apparatus 1.

It is further noted that a flowchart or the processing of the flowchart in the present application includes sections (also referred to as steps), which are represented, for instance, as S101. Further, each section can be divided into several subsections while several sections can be combined into a single section. Furthermore, each of thus configured sections can be referred to as a means or unit and achieved not only as a software device but also as a hardware device. Prior to the process (S101 to S104) by the application control circuit 15, the control circuit 2 of the navigation apparatus 13 executes a well-known navigation process (acquisition of a present position, route retrieval to a destination, route guidance, etc.), and transmits the data on present position of the subject vehicle acquired during the travel to the application control circuit 15 via the communications link 14. Upon receiving the data on present position, the application control circuit 15 stores a history of present positions or travel track in the travel track storage section 24.

The application control circuit 15 divides the travel track stored in the travel track storage section 24 into a straight line portion and a curve portion (S101). In such a case, based on the node N and the link L (refer to FIG. 3A) of the map data, the position extraction section 21 of the application control circuit 15 specifies an entrance, a middle, and an exit of a curve, thereby dividing the road shape into the straight line portion and the curve portion (also referred to only "curve"). It is noted that the above straight line portion signifies a road portion other than a curve without signifying a portion of the travel track being a straight line. It is noted that in the present embodiment, all the portions or the whole of the travel track stored in the travel track storage section 24 are divided into the straight line portion and the curve portion. That is, the travel track contains several curve potions and several straight line portions.

Figure 5:
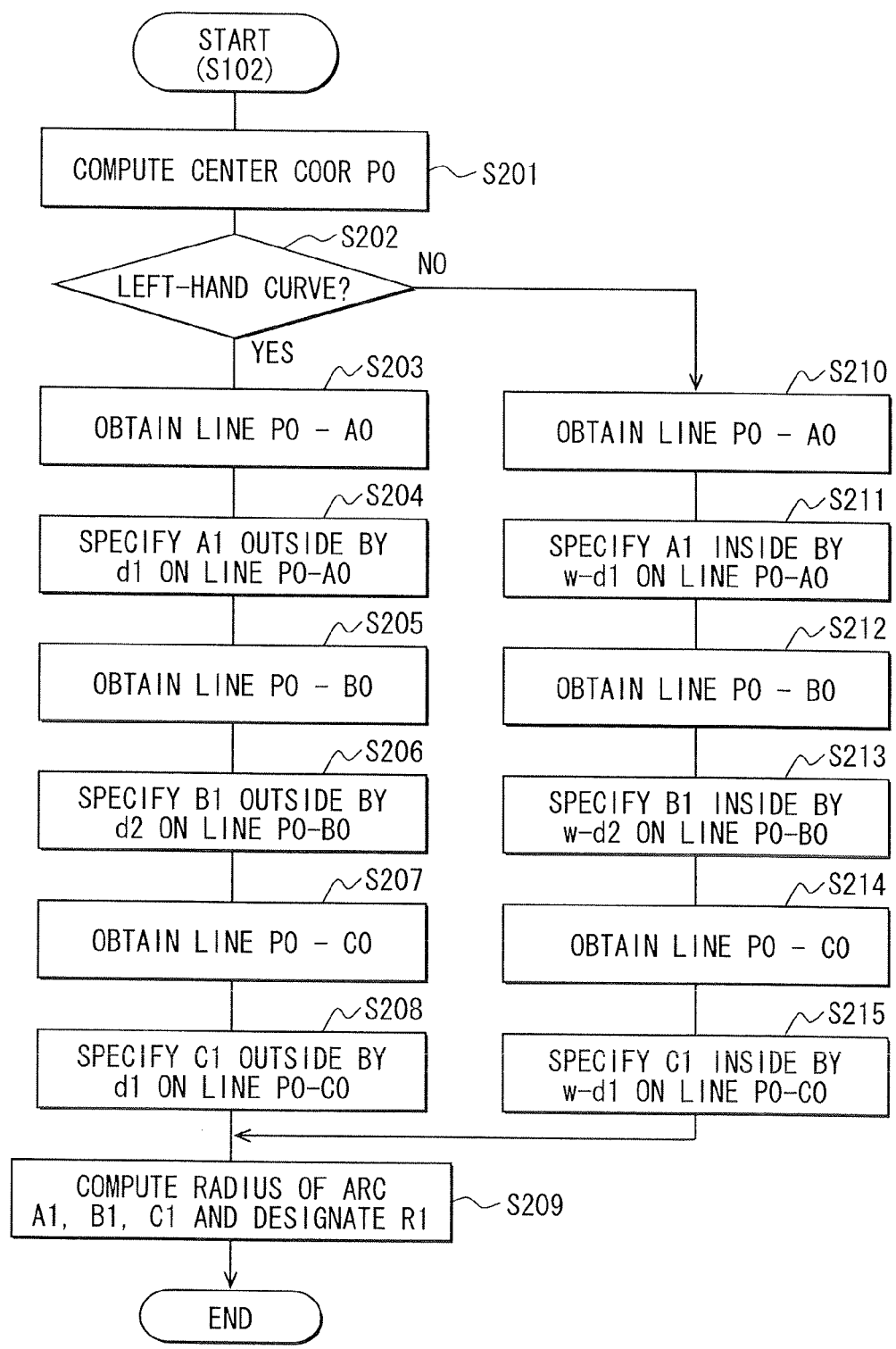
FIG. 5 is a flowchart for illustrating a process for curve shape amendment.

Then, the application control circuit 15 amends a curve shape (S102). The amendment of the curve shape is executed by the position amendment section 22 and curvature radius computation section 23, both of which the application control circuit 15 mainly executes by the functional block sections by using the software program. FIG. 5 is a flowchart of a curve shape amendment process. The curve shape amendment process contains amendments for either a left-hand curve or a right-hand curve, and a travel track. The following explains the amendments in order.

The position extraction section 21 computes a center coordinate P0 (refer to FIG. 3B) from the travel track (S201). In this case, the position extraction section 21 extracts an entrance coordinate, a middle coordinate, and an exit coordinate, all of which are coordinates nearest to the entrance, the middle, and the exit of the curve specified at S101, respectively, in the travel track stored in the travel track storage section 24. It is noted that instead of the entrance coordinate, middle coordinate, and exit coordinate being closest coordinates, they may be coordinates on straight lines connecting the entrance, the middle, and the exit with the center of the curvature radius, respectively. The position extraction section 21 thus extracts the entrance coordinate A0, the middle coordinate B0, and the exit coordinate C0 in FIGS. 6A, 6B. It is noted that FIGS. 6A, 6B do not illustrate the center coordinate P0.

After the position extraction section 21 extracts the entrance coordinate A0, the middle coordinate B0, and the exit coordinate C0, the position amendment section 22 calculates the center coordinate P0 (also referred to as a point P0) of the circular arc which passes through the entrance coordinate A0, the middle coordinate B0, and the exit coordinate C0. The position amendment section 22 determines whether the present curve is a left-hand curve or not from the position relation of the entrance coordinate A0, the middle coordinate B0, and the exit coordinate C0 (S202).

<Amendment to Left-Hand Curve>

When it is determined that it is a left-hand curve as illustrated in FIG. 6A (S202: YES), the position amendment section 22 obtains a straight line P0-A0 which passes through the point P0 and the entrance coordinate A0 (S203). Then, the position amendment section 22 specifies, on the straight line P0-A0, a point A1 (referred to as a post-amendment entrance coordinate A1), which is located radially outside of the circular arc centering on the point P0 from the entrance coordinate A0 by a distance d1 (S204). It is noted that the length d1 is an amendment value set up for the entrance coordinate A0 and the exit coordinate C0, and is also referred to as an amendment value H1. Further, as explained later, a distance d2 is an amendment value set up for the middle coordinate B0, and is also referred to as an amendment value H2. Each amendment value d1, d2 is set up previously, and stored in the ROM of the application control circuit 15, for example. In the present embodiment, each amendment value d1, d2 is set up as a distance up to the center line (in detail, a coordinate data equivalent to the distance up to the center line).

Then, the position amendment section 22 computes a straight line P0-B0 which passes through the point P0 and the middle coordinate B0 (S205). Then, the position amendment section 22 specifies, on the straight line P0-B0, a point B1 (referred to as a post-amendment middle coordinate B1), which is located radially outside of the circular arc centering on the point P0 from the middle coordinate B0 by a distance d2 (S206). It is noted that the relation between d1 and d2 is assumed based on the travel tendency of out-in-out mentioned above; thereby, the relation of d1<d2 (namely, H1<H2) is set up as amendment values responding to the travel tendency of out-in-out.

Similarly, with respect to the exit coordinate C0, the position amendment section 22 obtains a straight line which passes through the point P0 and the exit coordinate C0 (S207). Then, the position amendment section 22 specifies, on the straight line P0-C0, a point C1 (referred to as a post-amendment exit coordinate C1), which is located radially outside of the circular arc centering on the point P0 from the exit coordinate C0 by a distance d1 (S208). Posterior to the above amendments, the position amendment section 22 then calculates a radius of the circular arc which passes through the post-amendment entrance coordinate A1, the post-amendment middle coordinate B1, and the post-amendment exit coordinate C1, thereby setting up the obtained radius as a curvature radius R1 in the present curve (S209).

<Amendment to Right-Hand Curve>

When it is determined that it is not a left-hand curve as illustrated in FIG. 6B (S202: NO), the position amendment section 22 obtains a straight line P0-A0 which passes through the point P0 and the entrance coordinate A0 (S210). Then, the position amendment section 22 specifies, on the straight line P0-A0, a point A1, which is located radially inside of the circular arc centering on the point P0 from the entrance coordinate A0 by a distance w-d1 (S211). The distance w is a value, which is obtained from the road shape data in the map data and indicates a road width of a single lane of the road. That is, the distance w-d1 is also referred to as an amendment value H1 with respect to the right-hand curve.

Then, the position amendment section 22 calculates a straight line P0-B0 which passes through the point P0 and the middle coordinate B0 (S212). Then, the position amendment section 22 specifies, on the straight line P0-B0, a point B1, which is located radially inside of the circular arc centering on the point P0 from the middle coordinate B0 by a distance w-d2 (S213). The distance w d2 is also referred to as an amendment value H2 with respect to the right-hand curve.

That is, in the present embodiment, the amendment value d1 is set up to the entrance and exit of the curve; the amendment value d2 is set up to the middle of the curve. Furthermore, the amendment for the right-hand curve is based on the road width w of the lane; the amendment uses the amendment values d1, d2 used for the left-hand curve. In other words, the amendments relative to both the left-hand curve and the right-hand curve are performed based on the identical amendment values d1, d2.

Similarly, with respect to the exit coordinate C0, the position amendment section 22 obtains a straight line which passes through the point P0 and the exit coordinate C0 (S214). Then, the position amendment section 22 specifies, on the straight line P0-C0, a point C1, which is located radially inside of the circular arc centering on the point P0 from the exit coordinate C0 by a distance w-d1 (S215). Posterior to the above amendments, the position amendment section 22 then calculates a radius of the circular arc which passes through the post-amendment entrance coordinate A1, the post-amendment middle coordinate B1, and the post-amendment exit coordinate C1, thereby setting up the obtained radius as a curvature radius R1 in the present curve (S209).

As explained above, with respect to each of the left-hand curve and the right-hand curve, the road shape learning apparatus 1 amends the entrance coordinate A0, the middle coordinate B0, and the exit coordinate C0, and draws a circular arc which passes through the post-amendment entrance coordinate A1, the post-amendment middle coordinate B1, and the post-amendment exit coordinate C1, to thereby obtain a radius of the drawn circular arc. The obtained radius is designated as a curvature radius R1 of the curve. Thereby, the curvature radius R1 can be made into the value closer to that of the actual shape of the center of the road. As explained above, the amendment is explained for the case that a road is of a left-hand traffic like that in Japan, Great Briton; in contrast, in cases that a road is of a right-hand traffic like that in the United States of America, the relation of d1 and d2 and the direction of the amendment is only reversed. That is, with respect to the right-hand traffic, the relation of d1>d2 is required; in the left-hand curve, an amendment is made to move to radially inside of the circular arc while in the right-hand curve, an amendment is made to move radially outside of the circular arc.

<Amendment of Travel Track>

Returning to FIG. 4, after amending the curve shape as mentioned above at S102, the application control circuit 15 performs a travel track amendment by executing a parallel translation of the straight line portion to be connected with the entrance point and exit point of the curve posterior to the amendment (S103). This amendment may be executed by the travel track amendment section 25.

Figure 7C:
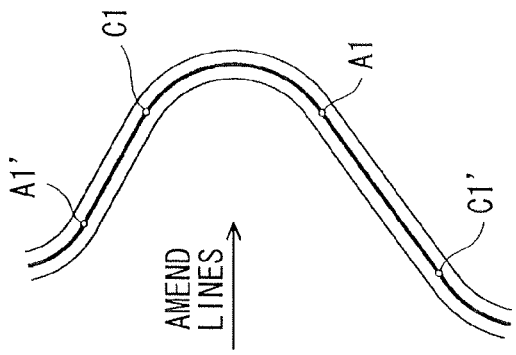
FIGS. 7A to 7C are schematic diagrams illustrating an amendment for a curve portion and a straight line portion.
Figure 7B:
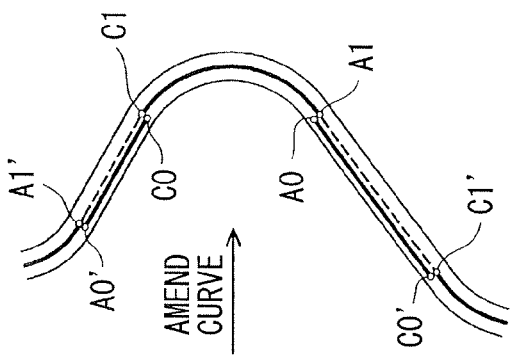
Figure 7A:
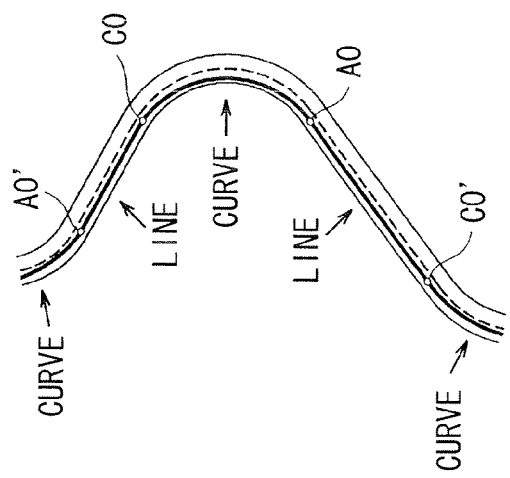

FIGS. 7A to 7C are diagrams for illustrating the travel track amendment step by step. FIG. 7A illustrates several curves, which were divided at S101, and straight line portions which are in between the curves. Herein, A0 and A0' represent the entrance coordinates; C0 and C0' represent the exit coordinates. The travel track amendment section 25 designates the circular arc, which was obtained after the curve amendment executed at above-mentioned S201-S215, as a center of the road (i.e., a center or middle in the road width direction) in the corresponding curve portion. Thereby, as illustrated in FIG. 7B, the travel locus of the curve portion is amended to be close to the center line of the curve. That is, the entrance coordinates A0 and A0' are amended to the post-amendment entrance coordinates A1 and A1', respectively; the exit coordinates C0 and C0' are amended to the post-amendment exit coordinates C1 and C1', respectively.

In such a case, the interval between the entrance coordinate A0 and the post-amendment entrance coordinate A1, the interval between the entrance coordinate A0' and post-amendment entrance coordinate A1', the interval between the exit coordinate C0 and the post-amendment exit coordinate C1, and the interval between the exit coordinate C0' and post-amendment exit coordinate C1' are equal to the identical amendment value d1. The travel track amendment section 25 then execute a parallel translation of each of the straight line portions between C0' and A0 and between C0 and A0' in FIG. 7A, only by the amendment value d1 to move towards the center line or the opposite lane. Thereby, the end point of the straight line portion (equivalent to the entrance coordinate A0) is moved to the post-amendment entrance coordinate A1; the starting point of the straight line portion (equivalent to the exit coordinate C0) is moved to the post-amendment exit coordinate C1. As a result, as illustrated in FIG. 7C, a travel track is obtained where each post-amendment entrance coordinate A1, A1' and each post-amendment exit coordinate C1 are arranged continuously.

When the curve shape amendment (S102) and the travel track amendment (S103) are completed, the application control circuit 15 determines whether it is the terminal end of the travel track (S104). That is, the application control circuit 15 determines whether the amendment is executed to the entire portions of the travel track stored in the travel track storage section 24. When determining that the amendment to the entire portions is completed (S104: YES), the application control circuit 15 ends the present process. In contrast, when determining that the amendment is not completed (S104: NO), the processing returns to S101, where the amendment described above is again executed.

When the above-mentioned amendment is completed, the application control circuit 15 designates the calculated curvature radius R1 as a curvature radius of the curve, and stores the designated curvature radius R1 in the learned data storage device 17 as learned data in association with the map data. Thereby, whenever the vehicle travels, the learned data based on the travel track of the vehicle are accumulated in the learned data storage device 17. In other words, the map data previously stored in the map data storage device 16 is improved by the learned data more similar to the actual road shape.

As explained above, according to the road shape learning apparatus 1 according to the present embodiment, the following effects can be acquired. When determining that the subject vehicle traveled a curve, the road shape learning apparatus 1 amends the positions of the subject vehicle in the entrance, middle, and exit of the curve (i.e., the entrance coordinate A0, the middle coordinate B0, and the exit coordinate C0) using the amendment values d1, d2. Then, a circular arc is drawn which passes through the post-amendment entrance coordinate A1, the post-amendment middle coordinate B1, and the post-amendment exit coordinate C1, to thereby obtain a radius of the drawn circular arc, i.e., a curvature radius R1 of the curve. Thus, the amendment responding to a travel tendency is made, thereby enabling the curvature radius R1 of the curve to come to be a value closer to that of the actual road shape. Therefore, the map data can be more based on the actual shape of the curve. That is, the shape of a road can be expressed more correctly and improved more specifically.

It is assumed that the travel tendency is so-called out-in-out; the amendment value for each curve direction (i.e., left-hand curve or right-hand curve) is designated in responding to the travel tendency. The shape of a road can be learned easily, without causing complication of the process when designating the amendment values. Each amendment value d1, d2 is designated as a distance from the center in the road width direction; the computed curvature radius R1 is designated as a value with respect to the center of the road width. Thus, the position information on the center line is memorized in the learned data; the amended shape of the road can be acquired by traveling in one traffic direction without need to travel in two opposite traffic directions. Moreover, since the shape of the road associated with an outward trip and a return trip can be learned by the one travel, the work required for the learning can be simplified. The amount of data memorized as the learned data and the capacity of the learned data storage device 17 to memorize the learned data can be simultaneously reduced.

The amendment values are designated in response to the travel tendency of out-in-out as follows. Herein, the amendment value relative to the entrance and exit of a curve is represented by d1; the amendment value relative to the middle of the curve is represented by d2; and the width of one lane of the road is represented by w. In such a case, the inequality expression of d1<d2 is designated. Thus, the curvature radius can be computed simply. Moreover, an entrance coordinate, a middle coordinate, and an exit coordinate are amended using d1 and d2 for the left-hand curve and using differences with a width w, i.e., w-d1 and w-d2 with respect to the right-hand curve. The identical amendment values d1, d2 can basically respond to both the left-hand curve and the right-hand curve. If the curve is traveled in the right-hand traffic instead of the left-hand curve, the amendments may be used reversely. That is, in the case of the right-hand traffic, the inequality expression d1>d2 is designated; the amendment direction relative to the left-hand curve is inward while the amendment direction relative to the right-hand curve is outward. The amendment values can respond to the road conditions of the countries in the world only by the change of set-ups of amendment direction or reversing of the equality expression.

Further, the road portion of the travel locus, which is before or after a curve, is also amended; thereby, more detailed map data can be obtained. In such a case, the road portion of the travel track before or after a curve are amended by the parallel translation, thereby not causing the complication of the arithmetic operation concerning the amendment. The computed curvature radius is memorized as the learned data associated with the map data; for example, the leaned data can be use for a next travel.

Modification of First Embodiment

A road shape learning apparatus according to a modification of the first embodiment of the present invention is explained with reference to FIGS. 8A to 8D. In the amendment of the travel track in the first embodiment, a road portion before or after the curve is regarded as a straight line. In contrast, an actual road has a so-called curve attachment portion before or after a curve. This curve attachment portion is prepared in order to prevent the sudden change of the steering manipulation at the time of entering a curve. Thus, when amending a travel track, the interpolation may be made using the shape corresponding to the curve attachment portion. Such interpolation corresponds to the amendment of the straight line portion (S103 in FIG. 4) in the first embodiment. In the case of the present modification, unlike the first embodiment, the straight line portion signifies a road portion the travel track of which is regarded as being almost linear.

FIGS. 8A to 8D are schematic diagrams illustrating the step-by-step amendment of the travel track in consideration of the curve attachment portion. FIG. 8A illustrates several types of road portions which are separated at S101. Those road portions contain (i) a curve portion, which is between A0-C0, (ii) straight line portions, which are located before X0 and after Y0, and (iii) curve attachment portions, which are located between X0-A0, and between C0-Y0. It is noted that X0 represents a start coordinate of a curve attachment portion, X1 (refer to FIG. 8C) represents a post-amendment start coordinate of the curve attachment portion; Y0 represents an end coordinate of the curve attachment portion; and Y1 (refer to FIG. 8C) represents a post-amendment end coordinate of the curve attachment portion.

The travel track amendment section 25 amends a curve shape like in the first embodiment. Thereby, as illustrated in FIG. 8B, the travel track of the curve portion is amended to be close to the center line of the curve. Moreover, like in the first embodiment, as indicated in FIG. 8C, the parallel translation of the straight line portions is made towards the center line. The portion (between X1-A1, between C1-Y1) corresponding to the prior-amendment curve attachment portion (between X0-A0, between C0-Y0) is interpolated using a curve. The curve for the interpolation may be a clothoid curve which is used for designing an actual curve attachment portion or a spline curve which connects smoothly between the end point X1 of the straight line portion and the post-amendment entrance coordinate A1 based on the coordinates data memorized as the travel track. Thereby, the travel track after amendment is obtained as a continuous track containing each point X1, A1, C1, and Y1 as illustrated in FIG. 8D.

Thus, the travel track stored in the travel track storage section 24 can be improved to be more detailed map data by amending portions before and after the curve. In particular, the amendment using curves is made, in the travel track, with respect to a road interval between the straight line portion (before X1) before entering the curve, which undergone the parallel translation, and the post-amendment entrance coordinate A1, and a road interval between the post-amendment exit coordinate C1 and the straight line portion (after Y1) after exiting the curve. The travel track can be thus amended as a smooth track connecting between a curve and straight line portions before and after the curve like the curve attachment portion in an actual road.

Second Embodiment

A second embodiment according to the present invention is explained with reference to FIGS. 9, 10. The road shape learning apparatus according to the second embodiment is different from that of the first embodiment in that it includes a control data generation section which generates control data for controlling a vehicle. The overall operation of the road shape learning apparatus according to the second embodiment is comparable to that of the first embodiment.

Figure 9:
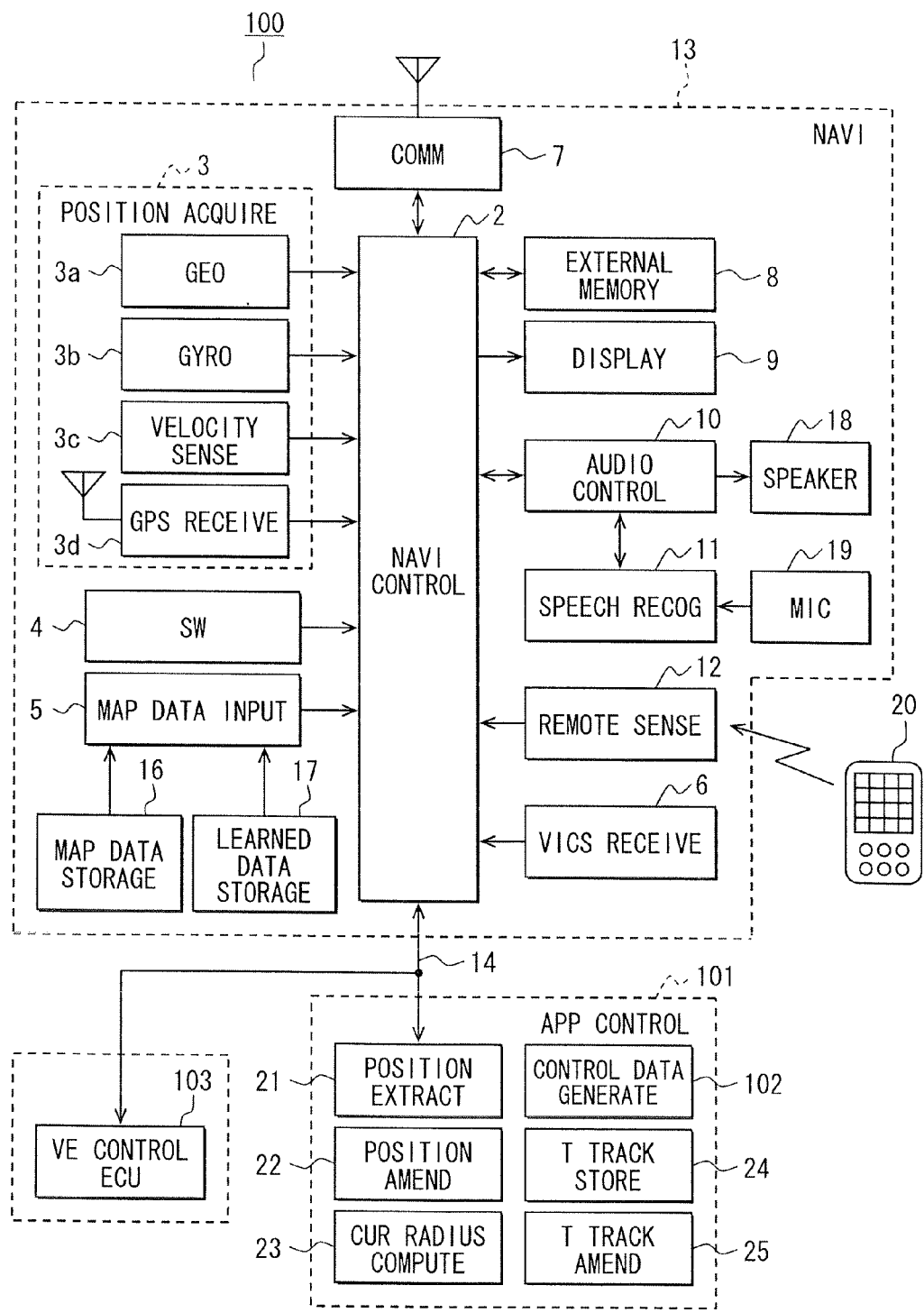
FIG. 9 is a diagram illustrating a schematic configuration of a road shape learning apparatus according to a second embodiment of the present invention.

As illustrated in FIG. 9, a road shape learning apparatus 100 of the second embodiment includes the navigation apparatus 13 and an application control circuit 101. The application control circuit 101 learns the shape of a curve like in the first embodiment based on the learned data acquired like in FIG. 4. Storing the learned data enables the map data to be improved to be more detailed data resembling the actual shape of a road. The present embodiment indicates an example of utilizing the improved map data for controlling a vehicle behavior, in particular, for controlling a vehicle velocity in entering a curve.

The application control circuit 101 includes a control data generation section 102. The control data generation section 102 generates control data suited with the shape of the curve the travel of which is scheduled, based on the learned data.

Figure 10:
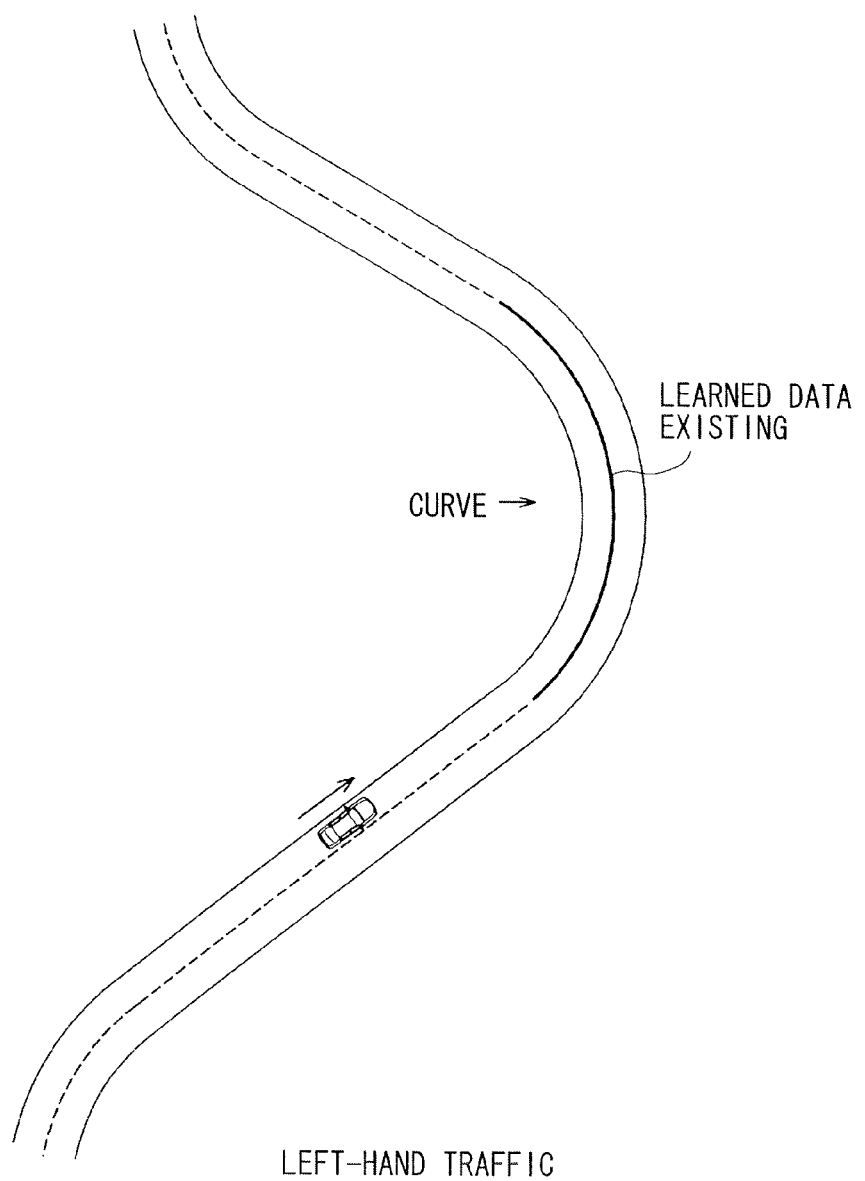
FIG. 10 is a diagram illustrating a shape of a road a vehicle travels.

FIG. 10 is a diagram illustrating a shape of a road a vehicle travels. The control data generation section 102 reads the learned data from the learned data storage device 17, and acquires the curvature radius R1 of the relevant curve at a point short of the curve portion, which was traveled and whose learned data is stored, (i.e., curve portion corresponding to "learned data existing" in FIG. 10. Based on the acquired curvature radius R1, a target vehicle velocity is computed; control data is generated to control the vehicle so as to travel at the target vehicle velocity. In such a case, as explained in the first embodiment, the curvature radius R1 stored in the learned data is closer to the actual shape of a road. The control made based on the learned data is improved in respect of the safety.

The control data generated in the control data generation section 102 is transmitted to the vehicle control ECU 103 via the communications link 14. The vehicle control ECU 103 is, for instance, an engine control ECU or a brake control ECU to control an engine or a brake so that the vehicle velocity becomes below the target velocity up to the time of entering the curve. At this case, the control data is transmitted also to the navigation apparatus 13; for example, the display device 9 displays the target velocity or an alarm message when the present velocity is higher than the target velocity, or the speaker 18 outputs an alarm using sounds.

Thus, as a method of utilizing the once leaned data, the road shape learning apparatus 100 generates the control data to control the vehicle behavior, in particular, to control the vehicle velocity when entering the curve. In such a case, like in the first embodiment, the learned data is more detailed compared with the map data previously stored in the map data storage device 16. In other words, the learned data, which records the road shape amended based on the travel track, has few errors; the degree of the accuracy is high enough to be used for controlling a vehicle. Thus, the curvature radius is computed based on the travel track, and the computed curvature radius is memorized as the learned data associated with the map data; thereby, the control data can be generated which controls the vehicle appropriately and more safely at the next travel of the curve.

Moreover, in such a case, if a curve attachment portion is interpolated with a curve like in the modification of the first embodiment, the behavior of the vehicle can be controlled more smoothly. That is, in the curve attachment portion, the travel with a fixed angular velocity is attained, increasing the safety of the travel.

Other Embodiments

Moreover, the present invention is not limited to each embodiment described above, and can be applied to various embodiments within the range which does not deviate from the gist. When a travel tendency of the vehicle indicates a travel along a center line instead of the out-in-out tendency, the amendment value may be designated as responding to such a travel tendency.

In the above embodiments, the amendments are made with respect to a road having a center line. In contrast, in the case that a road has no center line (e.g., a road having only one lane), the direction of the amendment (amendment towards an outside of the circular arc of the curve, or amendment toward an inside of the circular arc of the curve) may be varied depending on the road width contained in the road shape data stored in the map data.

In the case that a road has several lanes in one traffic direction (i.e., heading direction), the amendment values H1, H2 may be varied based on the lane the vehicle is traveling.

For example, suppose the case when the vehicle travels the first lane (in the case of Japan's traffic rule) of the two lanes in the one traffic direction. In the example of the first embodiment, with respect to a left-hand curve, the amendment value H1 relative to the entrance and exit of a curve may be designated as w+d1; the amendment value H2 relative to the middle of the curve may be designated as w+d2. Of course, with respect to a right-hand curve, amendment values may be designated depending on the lane the vehicle travels, similarly.

At S101, all the road portions are previously divided into a curve portion and a straight line portion. Instead of dividing all the road portions, another configuration may be provided as follows. A determination section may be provided to determine with respect to each road portion whether an amendment of a road shape is necessary with comparing with a predetermined threshold or reference; only when determining that amendment is necessary, the amendment may be executed. In such a case, a determination reference may be used which determines whether the difference between the travel track and the map data is greater than a predetermined threshold value.

The curvature radius is defined as a radius of a circular arc passing through an entrance coordinate, a middle coordinate, and an exit coordinate of the whole of the curve. The curve may be further divided so as to obtain more than one curvature radius. For example, suppose a so-called composite curve the curvature radius of which varies. If only one curvature radius is computed on the assumption that the whole of the compute curve is regarded as one curve, there is a possibility to have an error with the actual shape of the curve or road. To that end, based on the travel track, the curve may be divided further into several portions each of which has a different curvature radius; a curvature radius may be computed for each portion. The more accurate shape of the curve or road can be thus acquired. Further, other than the entrance coordinate, middle coordinate, and exit coordinate of the whole of the curve may be included for the computation of the curvature radius.

Although the configuration which includes the application control circuit and the control circuit of the navigation apparatus as separate independent bodies, two may be provided as one body. Moreover, each ECU may be provided with a function of the application control circuit.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory computer-readable storage media.

Aspects of the disclosure described herein are set out in the following clauses.

As an aspect of the disclosure, a road shape learning apparatus for a vehicle is provided as follows. A map data storage device is configured to store map data. A position acquisition device is configured to acquire position information relative to a position of the vehicle. A position extraction section is configured to, when it is determined that the vehicle traveled a curve, specify an entrance, a middle, and an exit of the curve based on the map data, and extract an entrance coordinate, a middle coordinate, and an exit coordinate which indicate the positions of the vehicle corresponding to the entrance, the middle, and the exit, respectively, from the position information relative to the vehicle acquired by the position information acquisition device. A position amendment section is configured to obtain a post-amendment entrance coordinate, a post-amendment middle coordinate, and a post-amendment exit coordinate, which are obtained by amending the entrance coordinate, the middle coordinate, and the exit coordinate using amendment values which are predetermined depending on a travel tendency. A curvature radius computation section is configured to compute a radius of a circular arc passing through the post-amendment entrance coordinate, the post-amendment middle coordinate, and the post-amendment exit coordinate and designate the computed radius as a curvature radius of the curve. A learned data storage device is configured to store the designated curvature radius as learned data associated with the map data.

As an optional aspect of the discloser, the position amendment section may be further configured to perform a curve direction determination as to whether the curve is a left-hand curve or a right-hand curve based on the position information relative to the vehicle acquired by the position acquisition section, and designate an amendment value responding to an out-in-out tendency of the travel tendency based on either one of the left-hand curve and the right-hand curve, which is determined by the performed curve direction determination.

At the time of traveling a curve, in order to reduce a lateral acceleration and to acquire a safe and comfortable driving, the travel tendency becomes out-in-out in many cases. Thus, the amendment value for each curve direction is designated or set up so as to respond to the travel tendency of out-in-out. The shape of the road can be thus learned easily, without causing of complication in processing or calculation.

Further, the position amendment section may be further configured to define an amendment value relative to each of the entrance coordinate and the exit coordinate as H1, and define an amendment value relative to the middle coordinate as H2. The position amendment section may be further configured to, with respect to a right-hand traffic, designate a relation of H1>H2 when the curve is determined to be the left-hand curve relative to a heading direction of the vehicle, and designate a relation of H1<H2 when the curve is determined to be the right-hand curve relative to a heading direction of the vehicle. The position amendment section may be further configured to, with respect to a left-hand traffic, designate a relation of H1<H2 when the curve is determined to be the left-hand curve relative to a heading direction of the vehicle, and designate a relation of H1>H2 when the curve is determined to be the right-hand curve relative to a heading direction of the vehicle.

When the travel tendency is the out-in-out tendency, with respect to the entrance and exit of the curve, an identical amendment value H1 is designated or set up previously, while, with respect to the middle position, an amendment value H2 is designated or set up previously. The curvature radius is thus computable simply. The relation between the amendment values H1 and H2 is an example of the designation in case that the vehicle travels the left-hand traffic, for example, like in Japan. In the case of the right-hand traffic like in the United States of America, the relation is reversed. That is, under the right-hand traffic, with respect to the left-hand curve relative to the heading direction of the subject vehicle, the relation is H1>H2; while with respect to the right-hand curve relative to the heading direction of the subject vehicle, the relation is H1<H2.

As an optional aspect of the disclosure, the position amendment section may be further configured to designate the amendment value as a value corresponding to a distance from a center in a road width direction.

Therefore, the curvature radius calculated based on the travel track turns into the curvature radius relative to the center of the road. Thereby, regardless of traveling the right-hand curve or left-hand curve, the curvature radius can be computed with respect to the center (i.e., width-direction center) of the road. Accordingly, without need to travel both a left-hand curve relative to a heading direction and a right-hand curve relative to a heading direction of an identical curve, namely without need of a round trip in the curve, the shape of the road can be learned. Moreover, since the shape of the road associated with an outward trip and a return trip can be learned by the one travel, the work required for the learning can be simplified. The amount of data memorized as the learned data and the capacity of the learned data storage section to memorize the learned data can be simultaneously reduced.

As an optional aspect of the disclosure, the road shape learning apparatus may further comprise: a travel track storage device configured to store the position information relative to the vehicle acquired by the position acquisition device as a travel track; and a travel track amendment section configured to amend the travel track stored in the travel track storage section. The travel track amendment section may be further configured to, with respect to the travel track stored in the travel track storage section, apply a parallel translation to a road portion before entering the entrance of the curve while applying a parallel translation to a road portion after exiting the exit of the curve, amending the travel track.

In this case, the road portion of the travel track before or after a curve are amended by the parallel translation, thereby not causing the complication of the arithmetic operation concerning the amendment.

As an optional aspect of the disclosure, the road shape learning apparatus may further comprises: a travel track storage device configured to store the position information relative to the vehicle acquired by the position acquisition device as a travel track; and a travel track amendment section configured to amend the travel track stored in the travel track storage section. The travel track amendment section may be further configured to, with respect to the travel track stored in the travel track storage section, interpolate using a curve an interval between the straight line portion and the post-amendment entrance coordinate in a road portion of the travel track before entering the curve, and an interval between the straight line portion and the post-amendment exit coordinate, in a road portion of the travel track after exiting the curve.

In this case, the interval between the straight line portion before the curve and the post-amendment entrance coordinate in the travel track, and the interval between the straight line portion after the curve and the post-amendment exit coordinate are interpolated using a spline curve or a clothoid curve, for instance. Thereby, the interval between the straight line portion before or after the curve and the curve can be connected smoothly like in a so-called curve attachment portion in an actual road.

As an optional aspect of the disclosure, the road shape learning apparatus may further comprises: a control data generation section configured to generate control data to control a behavior of the vehicle based on the learned data.

Thereby, based on the accumulated learned data, the behavior of the vehicle is controllable under the condition suited to the more actual shape of the road.

Further, the control data generation section may be further configured to generate control data to control a velocity of the vehicle.

Thus, when running the curve, the suitable velocity of the vehicle can be set up.

As an optional aspect of the disclosure, the position amendment section may be further configured to assume an out-in-out travel tendency, in which the vehicle travels a lane of the curve to generate a travel track forming a circular arc having a radius greater than a radius of a circular arc generated by a travel track generated by traveling the lane of the curve continuously along on a center of the lane in a width direction, and perform (i) a curve direction determination and (ii) a traffic direction determination, based on the map data and the acquired position information relative to the vehicle. Herein, the curve direction determination is as to whether the vehicle travels a curve in a curve direction of either a left-hand curve or a right-hand curve; the traffic direction determination is as to whether the vehicle travels a left-hand traffic or a right-hand traffic. The position amendment section may be further configured to then designate an amendment value responding to the out-in-out travel tendency, with respect to each curve direction of each traffic direction, based on results of the performed curve direction determination and the traffic direction determination.

At the time of traveling a curve, in order to reduce a lateral acceleration and to acquire a safe and comfortable driving, the driver has a travel tendency to drive the subject vehicle such that a travel track in the curve has a curvature radius greater than that of the actual shape of the curve. Such a travel tendency is called an out-in-out travel tendency. In addition, this travel tendency is found in many cases, regardless of traveling the left-hand traffic or right-hand traffic, or regardless of traveling the left-hand curve or the right-hand curve. Thus, the amendment value for each curve direction in each traffic direction is designated or set up so as to respond to the out-in-out travel tendency of driving the subject vehicle to form a curvature radius greater than that of the actual shape of the curve. The shape of the road can be thus learned easily, without causing of complication in processing or calculation.

It will be obvious to those skilled in the art that various changes may be made in the above-described embodiments of the present invention. However, the scope of the present invention should be determined by the following claims.

What is claimed:

1. A road shape learning apparatus for a vehicle, the apparatus comprising:
    a map data storage device configured to store map data;
    a position acquisition device configured to acquire position information relative to a position of the vehicle;
    a position extraction section configured to, when it is determined that the vehicle traveled a curve,
        specify an entrance, a middle, and an exit of the curve based on the map data, and
        extract an entrance coordinate, a middle coordinate, and an exit coordinate which indicate the positions of the vehicle corresponding to the entrance, the middle, and the exit, respectively, from the position information relative to the vehicle acquired by the position information acquisition device;
    a position amendment section configured to obtain a post-amendment entrance coordinate, a post-amendment middle coordinate, and a post-amendment exit coordinate, which are obtained by amending the entrance coordinate, the middle coordinate, and the exit coordinate using amendment values which are predetermined depending on a travel tendency;
    a curvature radius computation section configured to
        compute a radius of a circular arc passing through the post-amendment entrance coordinate, the post-amendment middle coordinate, and the post-amendment exit coordinate and
        designate the computed radius as a curvature radius of the curve; and
    a learned data storage device configured to store the designated curvature radius as learned data associated with the map data,
    the position amendment section being further configured to
        perform a curve direction determination as to whether the curve is a left-hand curve or a right-hand curve based on the position information relative to the vehicle acquired by the position acquisition section, and
        designate a predetermined amendment value responding to an out-in-out tendency of the travel tendency based on either one of the left-hand curve and the right-hand curve, which is determined by the performed curve direction determination,
    the position amendment section being further configured to
        define an amendment value relative to each of the entrance coordinate and the exit coordinate as H1,
        define an amendent value relative to the middle coordinate as H2,
        wherein H1 is different from H2;
    the position amendment section being further configured to
        with respect to a left-hand traffic,
        designate a relation of H1<H2 when the curve is determined to be the left-hand curve relative to a heading direction of the vehicle, and
        designate a relation of H1>H2 when the curve is determined to be the right-hand curve, relative to a heading direction of the vehicle.

2. The road shape learning apparatus according to claim 1, the position amendment section being further configured to, with respect to a right-hand traffic,
    designate a relation of H1>H2 when the curve is determined to be the left-hand curve relative to a heading direction of the vehicle, and
    designate a relation of H1<H2 when the curve is determined to be the right-hand curve relative to a heading direction of the vehicle.

3. The road shape learning apparatus according to claim 1, the position amendment section being further configured to designate the amendment value as a value corresponding to a distance from a center in a road width direction.

4. The road shape learning apparatus according to claim 1, further comprising:
    a travel track storage device configured to store the position information relative to the vehicle acquired by the position acquisition device as a travel track; and
    a travel track amendment section configured to amend the travel track stored in the travel track storage section,
    the travel track amendment section being further configured to, with respect to the travel track stored in the travel track storage section,
        apply a parallel translation to a road portion before entering the entrance of the curve while applying a parallel translation to a road portion after exiting the exit of the curve, amending the travel track.

5. The road shape learning apparatus according to claim 1, further comprising:
    a travel track storage device configured to store the position information relative to the vehicle acquired by the position acquisition device as a travel track; and a travel track amendment section configured to amend the travel track stored in the travel track storage section, the travel track amendment section being further configured to, with respect to the travel track stored in the travel track storage section,
interpolate using a curve
an interval between the straight line portion and the post-amendment entrance coordinate in a road portion of the travel track before entering the curve, and
an interval between the straight line portion and the post-amendment exit coordinate, in a road portion of the travel track after exiting the curve.

6. The road shape learning apparatus according to claim 1, further comprising:
a control data generation section configured to generate control data to control a behavior of the vehicle based on the learned data.

7. The road shape learning apparatus according to claim 6, the control data generation section being further configured to generate control data to control a velocity of the vehicle.

8. A road shape learning apparatus for a vehicle, the apparatus comprising:
a map data storage device configured to store map data;
a position acquisition device configured to acquire position information relative to a position of the vehicle;
a position extraction section configured to, when it is determined that the vehicle traveled a curve,
specify an entrance, a middle, and an exit of the curve based on the map data and
extract an entrance coordinate, a middle coordinate, and an exit coordinate which indicate the positions of the vehicle corresponding to the entrance, the middle, and the exit, respectively, from the position information relative to the vehicle acquired by the position information acquisition device;
a position amendment section configured to obtain a post-amendment entrance coordinate, a post-amendment middle coordinate, and a post-amendment exit coordinate, which are obtained by amending the entrance coordinate, the middle coordinate, and the exit coordinate using amendment values which are predetermined depending on a travel tendency;
a curvature radius computation section configured to
compute a radius of a circular arc passing through the post-amendment entrance coordinate, the post-amendment middle coordinate, and the post-amendment exit coordinate and
designate the computed radius as a curvature radius of the curve; and
a learned data storage device configured to store the designated curvature radius as learned data associated with the map data,
the position amendment section being further configured to
assume an out-in-out travel tendency, in which the vehicle travels a lane of the curve to generate a travel track forming a circular arc having a radius greater than a radius of a circular arc generated by a travel track generated by traveling the lane of the curve continuously along on a center of the lane in a width direction,
perform (i) a curve direction determination and (ii) a traffic direction determination, based on the map data and the acquired position information relative to the vehicle,
the curve direction determination being as to whether the vehicle travels a curve in a curve direction of either a left-hand curve or a right-hand curve,
the traffic direction determination being as to whether the vehicle travels a left-hand traffic or a right-hand traffic, and
designate a predetermined amendment value responding to the out-in-out travel tendency, with respect to each curve direction of each traffic direction, based on results of the performed curve direction determination and the traffic direction determination.

9. A road shape learning apparatus for a vehicle, the apparatus comprising:
a map data storage device configured to store map data;
a position acquisition device configured to acquire position information relative to a position of the vehicle;
a position extraction section configured to, when it is determined that the vehicle traveled a curve,
specify an entrance, a middle, and an exit of the curve based on the map data, and
extract an entrance coordinate, a middle coordinate, and an exit coordinate which indicate the positions of the vehicle corresponding to the entrance, the middle and the exit, respectively, from the position information relative to the vehicle acquired by the position information acquisition device;
a position amendment section configured to obtain a post-amendment entrance coordinate a post-amendment middle coordinate, and a post-amendment exit coordinate, which are obtained by amending the entrance coordinate, the middle coordinate and the exit coordinate using amendment values which are predetermined depending on a travel tendency;
a curvature radius computation section configured to
compute a radius of a circular arc passing through the post-amendment entrance coordinate, the post-amendment middle coordinate, and the post-amendment exit coordinate and
designate the computed radius as a curvature radius of the curve; and
a learned data storage device configured to store the designated curvature radius as learned data associated with the map data,
the position amendment section being further configured to
perform a curve direction determination as to whether the curve is a left-hand curve or a right-hand curve based on the position information relative to the vehicle acquired by the position acquisition section, and
designate a predetermined amendment value responding to an out-in-out tendency of the travel tendency based on either one of the left-hand curve and the right-hand curve, which is determined by the performed curve direction determination,
the position amendment section being further configured to
define an amendment value relative to each of the entrance coordinate and the exit coordinate as H1,
define an amendment value relative to the middle coordinate as H2,
wherein H1 is different from H1,
the position amendment section being further configured to, with respect to a right-hand traffic,
designate a relation of H1>H2 when the curve is determined to be the left-hand curve relative to a heading direction of the vehicle, and designate a relation of H1<H2 when the curve is determined to be the right-hand curve relative to a heading direction of the vehicle.

10. The road shape learning apparatus according to claim 9, the position amendment section being further configured to designate the amendment value as a value corresponding to a distance from a center in a road width direction.

11. The road shape learning apparatus according to claim 9, further comprising:
  a travel track storage device configured to store the position information relative to the vehicle acquired by the position acquisition device as a travel track; and
  a travel track amendment section configured to amend the travel track stored in the travel track storage section,
  the travel track amendment section being further configured to, with respect to the travel track stored in the travel track storage section,
    apply a parallel translation to a road portion before entering the entrance of the curve while applying a parallel translation to a road portion after exiting the exit of the curve, amending the travel track.

12. The road shape learning apparatus according to claim 9, further comprising:
  a travel track storage device configured to store the position information relative to the vehicle acquired by the position acquisition device as a travel track; and
  a travel track amendment section configured to amend the travel track stored in the travel track storage section.

13. The road shape learning apparatus according to claim 9, further comprising:
  a control data generation section configured to generate control data to control a behavior of the vehicle based on the learned data.

14. The road shape learning apparatus according to claim 13,
  the control data generation section being further configured to generate control data to control a velocity of the vehicle.

* * * * *